(12) United States Patent
Oravainen (10) Patent No.: US 9,940,858 B2
(45) Date of Patent: Apr. 10, 2018

(54) SYSTEM AND METHOD FOR ASSYMETRIC RENDERING TO EYES IN AUGMENTED REALITY AND VIRTUAL REALITY DEVICES

(71) Applicant: Unity IPR ApS, Copenhagen K (DK)

(72) Inventor: Juho Henri Rikhard Oravainen, Kannus (FI)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 15/596,909

(22) Filed: May 16, 2017

(65) Prior Publication Data

US 2017/0330496 A1 Nov. 16, 2017

Related U.S. Application Data

(60) Provisional application No. 62/337,208, filed on May 16, 2016.

(51) Int. Cl.

| | |
|---|---|
| *G02B 27/01* | (2006.01) |
| *G09G 3/00* | (2006.01) |
| *G06T 1/20* | (2006.01) |
| *G06F 3/01* | (2006.01) |
| *G06T 19/00* | (2011.01) |
| *G06T 3/40* | (2006.01) |

(Continued)

(52) U.S. Cl.
CPC ............. *G09G 3/003* (2013.01); *A63F 13/25* (2014.09); *A63F 13/52* (2014.09); *G02B 27/017* (2013.01); *G06F 3/011* (2013.01); *G06T 1/20* (2013.01); *G06T 3/4092* (2013.01); *G06T 19/006* (2013.01); *G09G 5/363* (2013.01); *G02B 2027/014* (2013.01); *G06T 2200/04* (2013.01); *G06T 2219/028* (2013.01); *G09G 2340/0407* (2013.01); *G09G 2340/0435* (2013.01); *G09G 2360/04* (2013.01)

(58) Field of Classification Search
None
See application file for complete search history.

(56) References Cited

U.S. PATENT DOCUMENTS

| | | | | |
|---|---|---|---|---|
| 6,147,695 | A * | 11/2000 | Bowen | ................... G06T 3/40 345/503 |
| 8,982,151 | B2 * | 3/2015 | Tardif | ................... G06F 3/1423 345/419 |

(Continued)

*Primary Examiner* — Joni Richer
(74) *Attorney, Agent, or Firm* — Schwegman Lundberg & Woessner, P.A.

(57) ABSTRACT

A head-mounted display device including first and second display surfaces associated with first and second eyes of the user, a graphics processing unit, one or more hardware processors, and an adaptive rendering module. The adaptive rendering module is configured to identify a threshold frame time, the threshold frame time representing an upper threshold of time to render frame data by the GPU, receiving a first frame time associated with rendering a first frame to the first eye and second eye of the user, the first frame being rendered at a target resolution, determining that the first frame time exceeds the threshold frame time, and lowering the resolution below the target resolution for parts of a second frame associated with the first eye of the user while maintaining the resolution for parts of the second frame at the target resolution for images associated with the second eye of the user.

22 Claims, 7 Drawing Sheets

(51) Int. Cl.
*A63F 13/25* (2014.01)
*A63F 13/52* (2014.01)
*G09G 5/36* (2006.01)

(56) References Cited

U.S. PATENT DOCUMENTS

2010/0103077 A1* 4/2010 Sugiyama ............ G02B 27/017
  345/8
2014/0087867 A1* 3/2014 Hightower .......... G07F 17/3213
  463/31
2014/0210869 A1* 7/2014 Mizushiro .............. G09G 3/003
  345/690

* cited by examiner

SYSTEM AND METHOD FOR ASSYMETRIC RENDERING TO EYES IN AUGMENTED REALITY AND VIRTUAL REALITY DEVICES

RELATED APPLICATIONS

This application claims the benefit of priority to U.S. Provisional Patent Application Ser. No. 62/337,208, filed May 16, 2016, herein incorporated by reference in its entirety.

TECHNICAL FIELD

The present disclosure relates to the field of virtual reality and, more specifically, to systems and methods for rendering images in virtual reality and mixed reality devices.

BACKGROUND

Some virtual reality (VR) devices, such as head-mounted displays (HMDs), allow a user to experience 3D virtual reality environments. In some known systems, HMDs display a different image for each eye of the user (e.g., in order to give the user a sense of depth). Some users of VR HMDs, however, may experience motion sickness while wearing the HMD. It has been found that higher display frame rates may help alleviate this issue. For example, a frame rate of 90 frames per second (fps) has been found to reduce motion sickness (for most users) to an acceptable level. Game engines at the core of modern games try to maintain high fps in order to provide a better experience for users. However, due to the highly dynamic nature of game play, the demands on the graphical processing unit (GPU) may fluctuate.

BRIEF DESCRIPTION OF THE DRAWINGS

Various ones of the appended drawings merely illustrate example embodiments of the present disclosure and cannot be considered as limiting its scope, and in which.

The headings provided herein are merely for convenience and do not necessarily affect the scope or meaning of the terms used. Like numbers in the Figures indicate like components.

In the description below, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

DETAILED DESCRIPTION

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

Motion sickness and graphical performance (e.g., frame rate) both present issues in the technical field of virtual reality. Motion sickness can occur in some users when experiencing a virtual environment, such as when wearing an HMD. Graphical performance of VR displays present technical challenges to hardware and software developers alike. There is pressure to maximize performance characteristics such as frame rate in order to maintain a certain level of user experience. Frame rates may be lowered temporarily (e.g., during periods of high demand), but this may negatively impact the performance of the display. Rendering resolution may be lowered temporarily while keeping the frame rate constant, but this may also have undesirable results for the user.

An adaptive rendering system and associated methods are described herein for reducing the computational burden on a VR graphics rendering system while providing an improved experience for the user. The adaptive rendering system mitigates some of the effects of motion sickness while providing improved computational methods for rendering graphical output (e.g., reducing computational burdens for the same perceived resolution).

Figure 1:
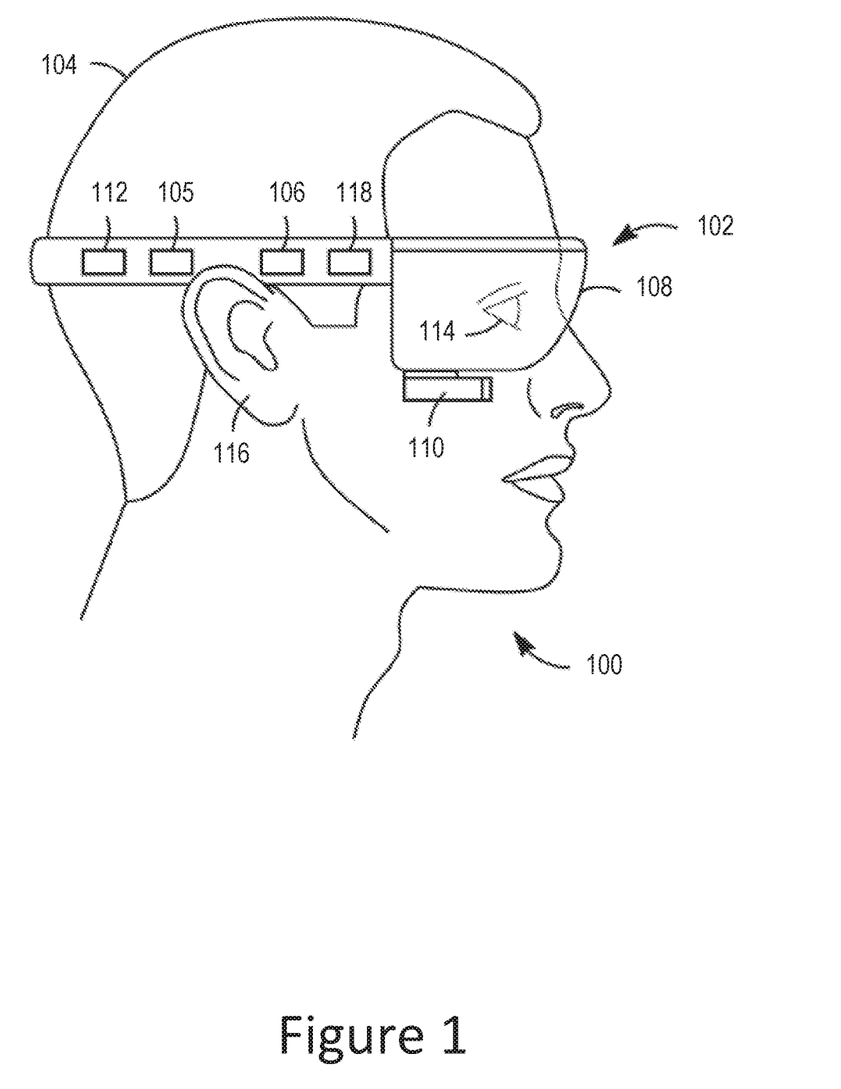
FIG. 1 is a diagram of an example HMD worn by a user.

FIG. 1 is a diagram of an example head-mounted display (HMD) 102, worn by a user (or "wearer") 100. In the example embodiment, the user 100 (e.g., a game developer or game player) experiences a VR environment or augmented reality (AR) content while wearing the HMD 102. In the example embodiment, the HMD device 102 may include an opaque visor 108 which may obscure the wearer 100's view of the real world, and which may display a complete virtual environment to the wearer 100. In other embodiments, the HMD device 102 includes a transparent or semi-transparent visor (or "lens", or "lenses") 108 through which the wearer 100 views their surroundings (also herein referred to also as "the real world"). It should be understood that the visor 108 is illustrated in FIG. 1 as transparent for purposes of illustration but, as described above, the visor 108 may be opaque in some embodiments.

In the example embodiment, the HMD 102 also includes a display device 118 that renders graphics (e.g., virtual objects) onto the visor 108. As such, the visor 108 acts as a "screen" or surface on which the output of the display device 118 appears, and through which the wearer 100 experiences virtual content. In some embodiments, the HMD 102 may present two different projections via the visor (e.g., one for each eye). The display device 118 is driven or controlled by one or more GPUs 106 or holographic projection units (HPUs). The GPU 106 processes aspects of graphical output that assists in speeding up rendering of output through the display device 118.

In the example embodiment, the HMD device 102 also includes one or more central processing units (CPUs) 105 that may execute some of the operations and methods described herein. The HMD device 102 also includes an audio device 112 (e.g., speakers, not separately depicted) that is configured to present audio output to the wearer 100 (e.g., via ears 116 of the user 100). While not separately shown, the HMD device 102 also includes wired or wireless network adapters (e.g., Wi-Fi, Bluetooth, cellular) that facilitate communication between the HMD and other computing devices described herein.

In some embodiments, the HMD device 102 includes a digital camera device 110. The digital camera device (or just "camera") 110 is a forward-facing video input device that is oriented so as to capture at least a portion of a field of view (FOV) of the wearer 100. In other words, the camera 110 captures or "sees" an angle of view of the real world based on the orientation of the HMD device 102 (e.g., similar to what the wearer 100 sees in the wearer 100's FOV when looking through the visor 108). The camera devices 110 may be configured to capture real-world digital video around the user 100 (e.g., a field of view, a peripheral view, or a 360° view around the wearer 100). The camera devices 110 may be used to capture digital video of the real world environment around the user 100. In some embodiments, output from the digital camera device 110 may be projected onto the visor 108 (e.g., in opaque visor embodiments), and may also include additional virtual content (e.g., added to the camera output). In some embodiments, the camera 110 may be a depth camera, or the HMD device 102 may otherwise include a depth sensor, capturing depth information for objects within the FOV of the user 100.

In some embodiments, the HMD device 102 may include one or more sensors (not separately shown), or may be coupled in wired or wireless communication with the sensors (e.g., via near-field communication (NFC) with a wrist-wearable device also worn by the wearer 100). For example, the HMD 102 may include motion or position sensors configured to determine a position or orientation of the HMD 102 or position of nearby real-world objects. In some embodiments, the HMD device 102 may include a microphone for capturing audio input (e.g., spoken vocals of the user 100).

In some embodiments, the HMD device 102 may be similar to virtual reality HMDs such as the Oculus Rift™, The HTC Vive™, The Playstation VR™, and the like. In some embodiments, the user 100 may hold one or more hand tracking devices ("handhelds") (not separately shown in FIG. 1) (e.g., one in each hand). The handhelds provide information about the absolute or relative position and orientation of a user's hands and, as such, are capable of capturing hand gesture information. The handhelds may be configured to operate directly with the HMD 102 (e.g., via wired or wireless communication). In some embodiments, the handhelds may be Oculus Touch™ hand controllers, HTC Vive™ hand trackers, or Playstation VR™ hand controllers. The handhelds may also include one or more buttons or joysticks built into the handheld. In other embodiments, the user 100 may wear one or more wearable hand tracking devices (e.g., motion tracking gloves, not shown), such as those made commercially available by Manus VR (Netherlands). In still other embodiments, hand motion of the user 100 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position one or more of the hands of the user during operation.

During operation, in the example embodiment, the HMD 102 is mounted on a head 104 of the wearer, and over both eyes 114 of the wearer 100, as shown in FIG. 1. The wearer 100 may be presented with a virtual environment which may be experienced via the HMD 102 and handhelds as described herein. Further, an adaptive rendering system (not separately shown in FIG. 1) is used in conjunction with the HMD 102 to adaptively render the VR environment or mixed-reality (MR) environment, as described herein. The adaptive rendering system may, for example, be provided by the GPU 106, or may be provided as a part of a gaming engine (e.g., executed by the CPU 104).

Figure 2:
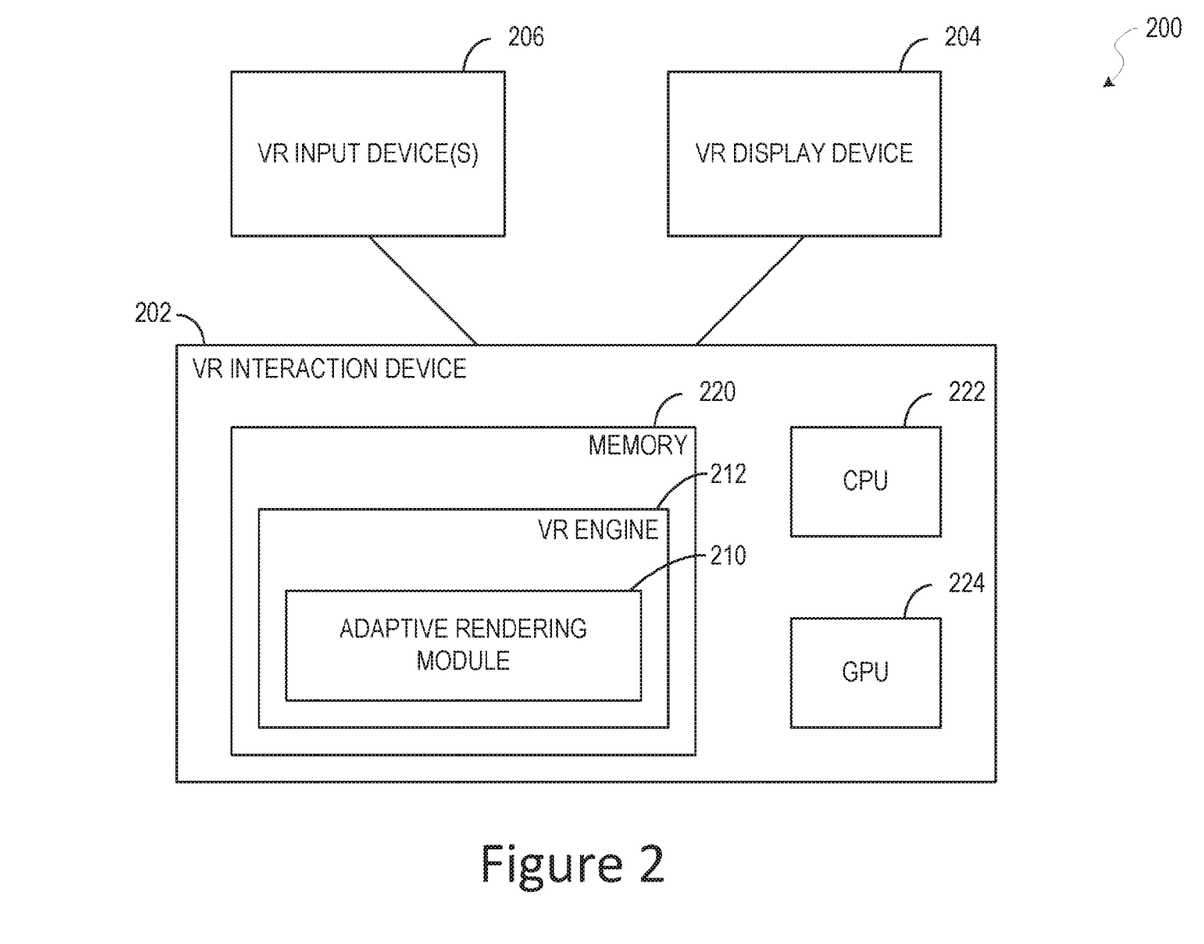
FIG. 2 is a component diagram of an adaptive rendering system that includes components similar to the HMD shown in FIG. 1.

FIG. 2 is a component diagram of an adaptive rendering system 200 that includes components similar to the HMD 102 and the handhelds discussed in relation to FIG. 1. In the example embodiment, the adaptive rendering system 200 includes a VR interaction device 202, a VR display device 204, and one or more VR input devices 206. In some embodiments, the VR display device 204 may be similar to the visor 108, and the VR input device(s) 206 may be similar to the handhelds or other tracking devices described above in reference to FIG. 1.

In the example embodiment, the VR interaction device 202 includes a memory 220, one or more CPUs 222, and one or more GPUs 224 or HPUs. In some embodiments, the CPU 222 may be similar to the CPU 105, the GPU 224 may be similar to the GPU 106, and the VR interaction device 202 may be a part of the HMD 102. In some embodiments, the adaptive rendering system 200 and the various associated hardware and software components described herein may provide AR content instead of, or in addition to, VR content (e.g., in an MR environment). It should be understood that the systems and methods described herein may be performed with AR content and, as such, the scope of this disclosure covers both AR and VR applications.

In the example embodiment, VR interaction device 202 includes a VR engine 212, executed by the CPU 222 and/or GPU 224, that provides a VR environment through the VR display device 204 (e.g., to the user 100). The VR engine 212 includes an adaptive rendering module 210 that enables various aspects of adaptive rendering as described herein. The adaptive rendering module 210 may be implemented within, or communicate with, a larger more generic VR software application such as the VR engine 212 (e.g., a virtual reality editing or gaming application).

The adaptive rendering module 210 and the VR engine 212 include computer-executable instructions residing in the memory 220 that are executed by the CPU 222 and optionally with the GPU 224 during operation. The VR engine 212 communicates with the VR display device 204 (e.g., the HMD 102) and also with other VR hardware such as the VR input device(s) 206 (e.g., motion capture devices such as the handhelds). The adaptive rendering module 210 may be integrated directly within the VR engine 212, or may be implemented as an external piece of software (e.g., a plugin).

Figure 3:
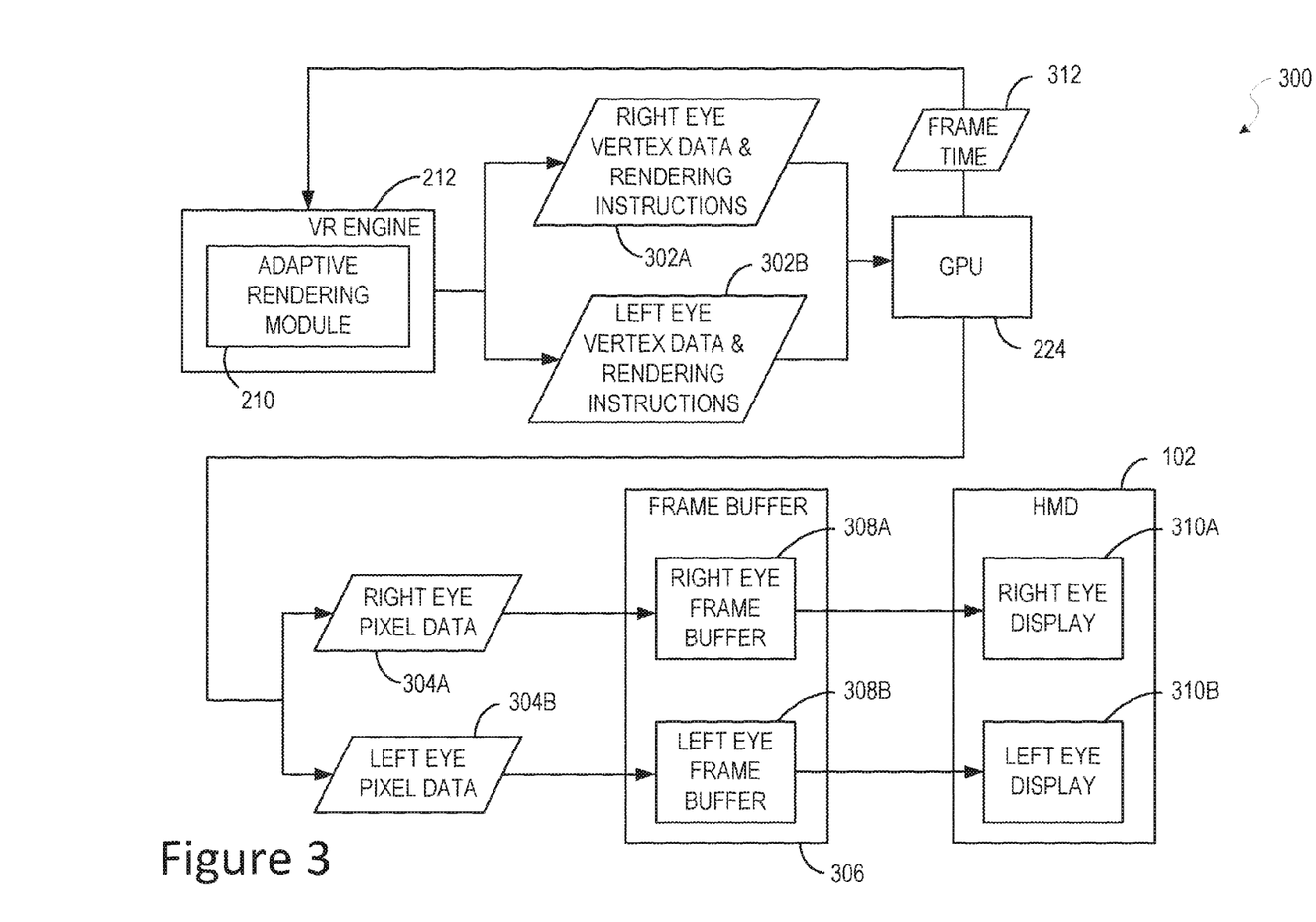
FIG. 3 is a flow chart illustrating an example rendering pipeline for providing adaptive rendering by the adaptive rendering module via the HMD.

FIG. 3 is a flow chart 300 illustrating an example rendering pipeline for providing adaptive rendering by the adaptive rendering module 210 via the HMD 102. In the example embodiment, the display device 204 of the HMD 102 includes two separate displays, a right eye display 310A and a left eye display 310B. The VR engine 212 outputs vertex data and rendering instructions 302A, 302B (collectively, rendering instructions 302) to the GPU 224 that instruct the GPU 224 on how to render the data into an image for presentation to the user 100 on the display device 204. More specifically, the VR engine 212 generates separate vertex data and rendering instructions for each eye (e.g., right eye vertex data and rendering instructions 302A and left eye vertex data and rendering instructions 302B). The rendering instructions 302 may include, for example, information for all shaders (e.g., geometry shaders and fragment shaders), state settings, and rendering commands.

In the example embodiment, the GPU 224 receives the rendering instructions 302 for each eye and uses those rendering instructions 302 to render a separate pixelated image for each eye (e.g., right eye pixel data 304A and left eye pixel data 304B, collectively, image data 304 or image 304). The image data 304 for each eye is sent to a framebuffer 306 to await presentation on the display device 204. Each image 304 is specific to an eye, and each eye display device 310 has a separate framebuffer (e.g., a right eye framebuffer 308A and a left eye framebuffer 308B). In other words, the left eye display 310B reads and displays images (e.g., left eye pixel data 304B) from the left eye framebuffer 308B, while the right eye display 310A reads and displays images (e.g., right eye pixel data 304A) from the right eye framebuffer 308A. In the example embodiment, the framebuffer 306 is a component of the GPU 224.

During operation, in the example embodiment, the adaptive rendering module 210 monitors a frame time 312 of the GPU 224. The frame time 312 is an amount of time the GPU 224 takes to render a single image through the rendering process (e.g., from vertex data 302 to pixel data 304). If the frame time 312 becomes too long (e.g., due to heavy processing demands), then the frame rate may drop because the frames are not ready for display at the rate necessary to maintain a target frame rate. As such, the adaptive rendering module 210 may take mitigating actions (e.g., lowering the resolution of one eye) based at least in part on the frame time 312, as described in greater detail below. Acting based on the frame time 312 may allow the adaptive rendering module 210 to react (e.g., to reduce computational burdens) before the frame rate drops below the target frame rate. In some embodiments, the adaptive rendering module 210 may additionally, or alternatively, monitor the frame rate (not separately depicted, e.g., over multiple frames) and take mitigating actions based at least in part on the frame rate. In some embodiments, the adaptive rendering module 210 may additionally, or alternatively, monitor aspects of content of the rendering to determine when to take mitigating actions. For example, if the previous frame time 312 was near a limit when it may impact the target frame rate, and the next frame includes content implicating additional computational burdens (e.g., more objects, more vertices, an image effect being enabled), then the adaptive rendering module 210 may take mitigating actions based on those aspects of content.

In the example embodiment, the adaptive rendering module 210 instructs the GPU 224 to output frames at a nominal rate (e.g., a target frame rate of 90 fps, or 1 frame every 0.011 seconds) for each eye such that the total number of frames generated by the GPU 224 is equivalent to twice the nominal rate (e.g., 180 fps, or 1 frame every 0.0056 seconds). If the output frame time 312 increases above an acceptable time, or "threshold frame time" (e.g., a predetermined threshold, such as the maximum time required to maintain the nominal frame rate), the adaptive rendering module 210 reacts by modifying subsequent rendering instructions 302 sent to the GPU 224. The rendering instructions 302 for one or more of the eyes are modified (e.g., throttled) in order to, for example, help the GPU 224 to reduce the output frame time 312 until the frame time 312 returns to a time that allows the nominal frame rate to be reached (e.g., below the threshold frame time). Once the output frame time 312 for the GPU 224 drops below the threshold frame time that meets the nominal frame rate, the adaptive rendering module 210 resumes the output of normal rendering instructions 302. In some embodiments, the threshold frame time may be based on the target frame rate (e.g., 0.011 seconds threshold frame time in order to achieve 90 fps).

More specifically, in the example embodiment, when throttling, the rendering instructions 302 sent to the GPU 224 (e.g., while the frame time 312 is above the threshold frame time) includes a reduced rendering target (e.g., reduced resolution) for one of the two eyes (i.e., for the "reduced eye"), while the other eye continues with a normal rendering target (i.e., for the "normal eye"). For example, during throttling, the adaptive rendering module 210 may alter the rendering target for the left eye of the user 100 from 4K resolution to HD resolution (e.g., 1080p, in the instructions 302B), while the rendering target for the right eye of the user 100 remains at 4K (e.g., from the instructions 302A).

In the example embodiment, throughout the rendering process, and while throttling, the GPU 224 renders the image for the reduced eye onto the reduced rendering target while rendering the image for the normal eye onto the full sized rendering target. The reduced rendering target for the first eye lowers the computational burden on the GPU 224, thereby allowing the GPU 224 to reduce the frame time 312 for the first eye, thereby allowing the GPU 224 to generate frames at the nominal frame rate, even while the second eye has a full sized rendering target. During throttling, the user 100 wearing the HMD 102 will experience a first display with a reduced resolution image in their reduced eye and a second display with full resolution image in their normal eye while the frame time 312 is above the threshold frame time. Because one of their eyes still sees a full resolution image, the human brain of the user 100 is thus fooled into thinking they are looking at the higher resolution image from both eyes even though one eye is seeing a reduced resolution image.

In the example embodiment, the size of the output framebuffer 308 stays constant and the reduced rendering target is used only for intermediate image buffers within the rendering pipeline. This allows the GPU to work only on a reduced amount of data for one eye (e.g., fewer pixels due to lower resolution image) while the final output framebuffer size stays constant.

In the example embodiment, the final output pixel data 304 to the framebuffer 308 is scaled up to cover the entire higher resolution framebuffer (e.g., by the GPU 224 using texture filtering). In some embodiments, upscaling may be performed with lens distortion handling. In other embodiments, upscaling may vary based on which kind of image corrections the HMD 102 needs (e.g., may depend on the headset, or may depend on which operations needed to be performed on low resolution image data versus which need to be done on high resolution image data). Accordingly, in the example embodiment, the image seen in the HMD display 310 is the same final image size for each eye after the upscaling is performed for the low resolution eye.

In some embodiments, the amount of reduction of the rendering target for the first eye is related to the amount of frame time 312 increase above the acceptable level. For example if the frame time increases by 10%, then the rendering target can be reduced by an amount of approximately 10% (e.g., proportionally). In some embodiments, the reduction of the rendering target size may not be linearly related to the increase in frame time 312 above the acceptable level. In some embodiments, the reduction of the rendering target for the reduced eye is fixed (e.g., 50% of normal, regardless of the amount of increase in the frame time 312).

In some embodiments, the normal resolution image and reduced resolution image will alternate from the right display to the left display. In other words, the adaptive rendering module 210 may alter which eye is the normal eye and which eye is the reduced eye. For example, the adaptive rendering module 210 may alternate the reduced eye every pre-determined number of frames (e.g., every other frame, or every two frames, or every 5 frames), or may alternate the reduced eye every pre-determined period of time (e.g., every 0.2 seconds, or every 0.5 seconds). This may help mitigate possible fatigue experienced by one particular eye of the user 100 viewing the low resolution image on the display.

The alternating low resolution image from right eye to left eye and back again may create a flicker (e.g., at half the frame rate). For example the nominal frame rate of 90 fps may generate a flicker at 45 fps, which can be perceived by the human eye in VR and AR applications. However, a higher nominal frame rate of >=120 fps may have flicker of roughly >=60 fps, which is generally imperceptible for the human eye, or may cause less discomfort for the wearer. As such, in some embodiments, the alternating (e.g., back and forth from a first display and a second display) of the high resolution image is done at 120 fps. In other words, when both eyes are being refreshed at 120 fps, and when the low resolution eye is changed every other frame (e.g., 60 fps, or half the frame rate), then the flicker effect should be mitigated by the high nominal frame rate. The alternating at 120 fps may produce a sharp image as perceived by the user 100, and the flicker would be too fast to be perceived by a human eye. As such, this enables content to be rendered at a high rate (e.g., 120 fps) with the same number of pixels processed as with current 90 fps technology, thereby delivering more content with the same or similar computational burden.

In some embodiments, the adaptive rendering module 210 may anticipate a drop in frame time 312 and perform the reduction methods described herein (e.g., prior to the GPU 224 dropping below the nominal rate). For example, the VR engine 212 may use historical data on frame rates (e.g., historical dips in frame time 312), and/or upcoming processing demands to project a possible reduction in the upcoming frame rate below the nominal value. Accordingly, in such situations, the VR engine 212 may reduce the resolution of the images presented to one of the eyes to help compensate for upcoming factors that may otherwise increase the frame time 312.

In some embodiments, the adaptive rendering module 210 may blend the content of subsequent frames together to make a sharper image. For example, one frame may contain a low frequency background image and the next brings in higher frequency details. In some embodiments, the vertex complexity may be reduced on the low resolution frames, or may use lower texture MIP levels. In some embodiments, instead of fully rendering the low resolution image, the adaptive rendering module 210 may reconstruct the frame from previous frames using motion vectors.

Figure 4:
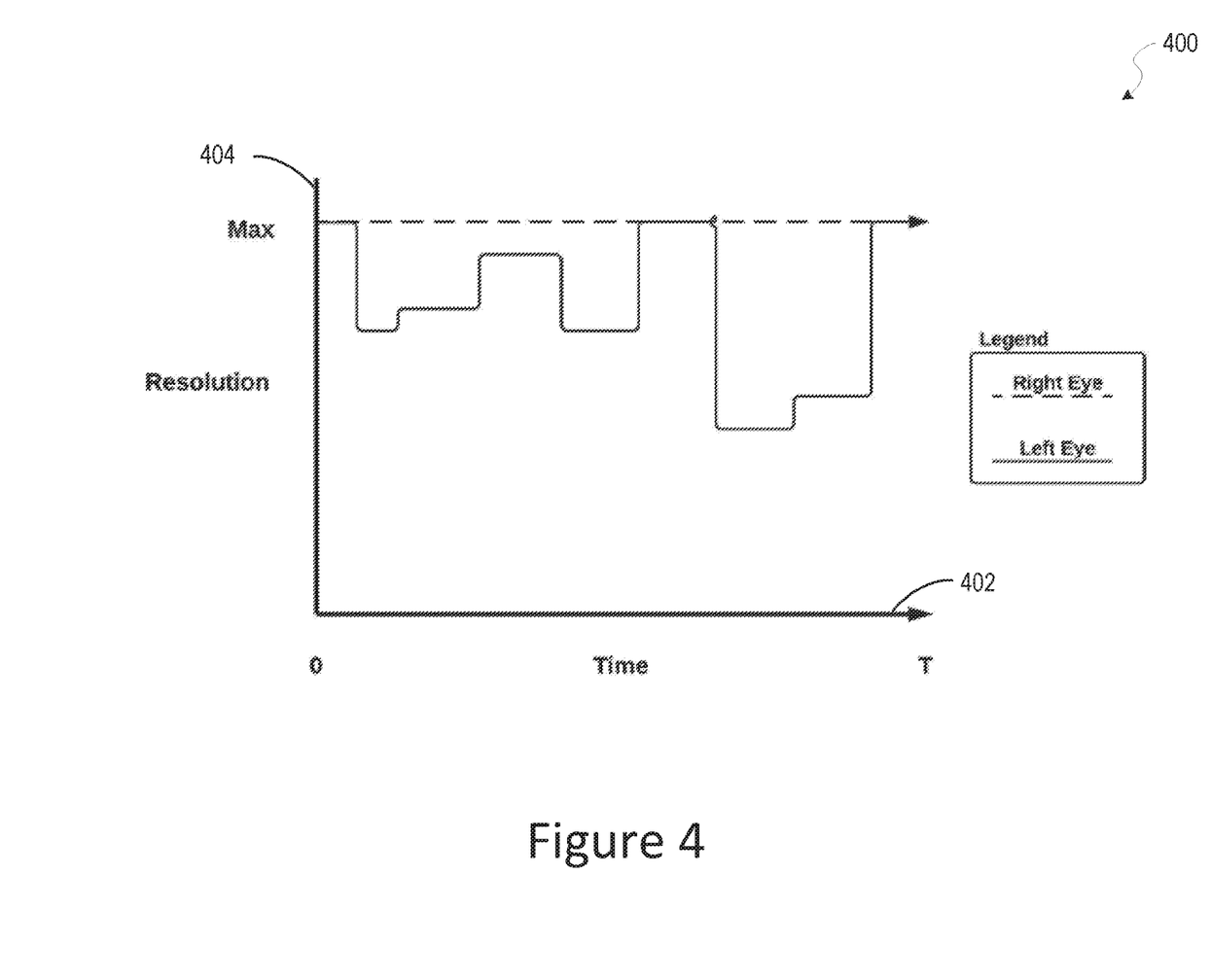
FIG. 4 is an example graph illustrating the resolution over time for the two displays in the HMD.

FIG. 4 is an example graph 400 illustrating the resolution over time for the two displays 310A, 310B in the HMD 102.

The graph 400 includes an X-axis 402 representing time (T), and a Y-axis 404 representing resolution of each of the displays 310. In the example embodiment, the left eye (e.g., left display 310B) is the reduced eye. Each display has a maximum resolution (e.g., initially the same for each display 310), which may be set, for example, based on the properties or limits of the displays 310 and the GPU 224. The right display 310A (e.g., for the right eye) maintains the maximum resolution over the (e.g., even while throttling), as shown with the broken line in FIG. 4. The left display 310B (e.g., for the left eye) receives and displays an image of reduced resolution, as shown by the solid line. In this example, the amount of the reduced resolution, and the duration of the reduced resolution for the left display 310B is varied by the adaptive rendering module 210 (e.g., based on the frame time 312 of the GPU 224 during operation).

Figure 5:
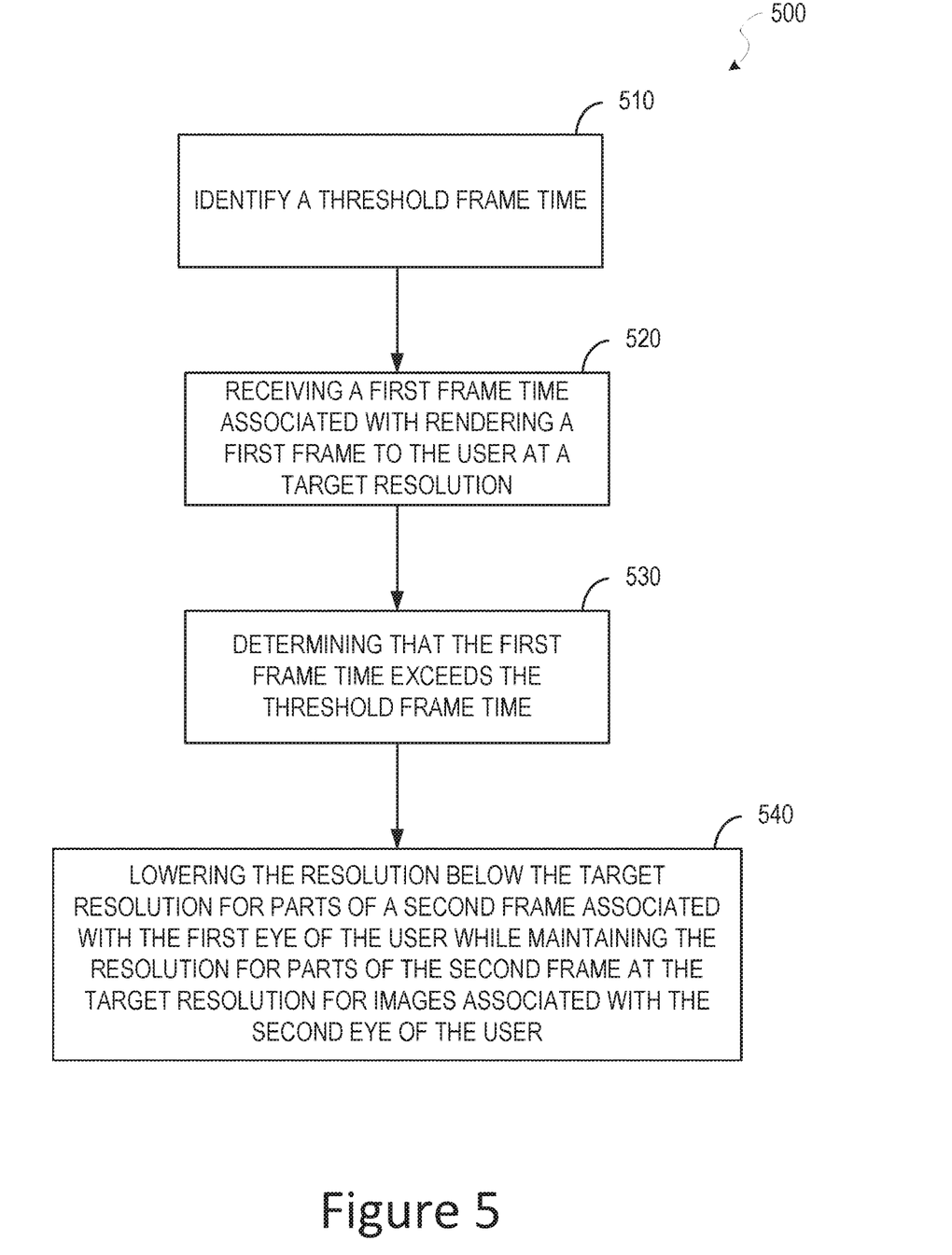
FIG. 5 is a flowchart of an example computer-implemented method for providing adaptive rendering of images.

FIG. 5 is a flowchart of an example computer-implemented method 500 for providing adaptive rendering of images. The computer-implemented method 500 (hereafter referred to as "the method 500") is performed by a computing device including at least one hardware processor and a memory. In the example embodiment, the method 500 includes identifying a threshold frame time, the threshold frame time representing an upper threshold of time to render frame data by a graphics processing unit (GPU), the GPU being configured to render graphical content for presentation to a user via first and second display surfaces, the first and second display surfaces being configured to display graphical content to the user, the first display surface is associated with a first eye of the user, the second display surface is associated with a second eye of the user (see operation 510).

In the example embodiment, the method 500 also includes receiving a first frame time associated with rendering a first frame to the first eye and second eye of the user, the first frame being rendered at a target resolution (see operation 520). The method 500 further includes determining that the first frame time exceeds the threshold frame time (see operation 530).

In the example embodiment, the method 500 also includes lowering the resolution below the target resolution for parts of a second frame associated with the first eye of the user while maintaining the resolution for parts of the second frame at the target resolution for images associated with the second eye of the user (see operation 540). In some embodiments, lowering the resolution includes transmitting rendering instructions for a second frame to the GPU, the rendering instructions including instructions for rendering a first image for the first display surface at a reduced resolution that is less than the target resolution and for rendering the first image for the second display surface at the target resolution.

In some embodiments, the first eye of the user is a reduced resolution eye, and the second eye of the user is a target resolution eye, and the method 500 further includes changing the reduced resolution eye from the first eye of the user to the second eye of the user at a pre-determined interval. In some embodiments, the pre-determined interval is a pre-determined number of frames. In some embodiments, the target frame rate is greater than or equal to 120 frames per second (fps), and the pre-determined interval is every other frame.

In some embodiments, the method 500 further include determining a lower resolution rate for the images associated with the first eye based on a difference between the first frame time and the threshold frame time. In some embodiments, the method 500 further includes determining a lower resolution rate for the images associated with the first eye based on an amount needed to maintain a target frame rate.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 6:
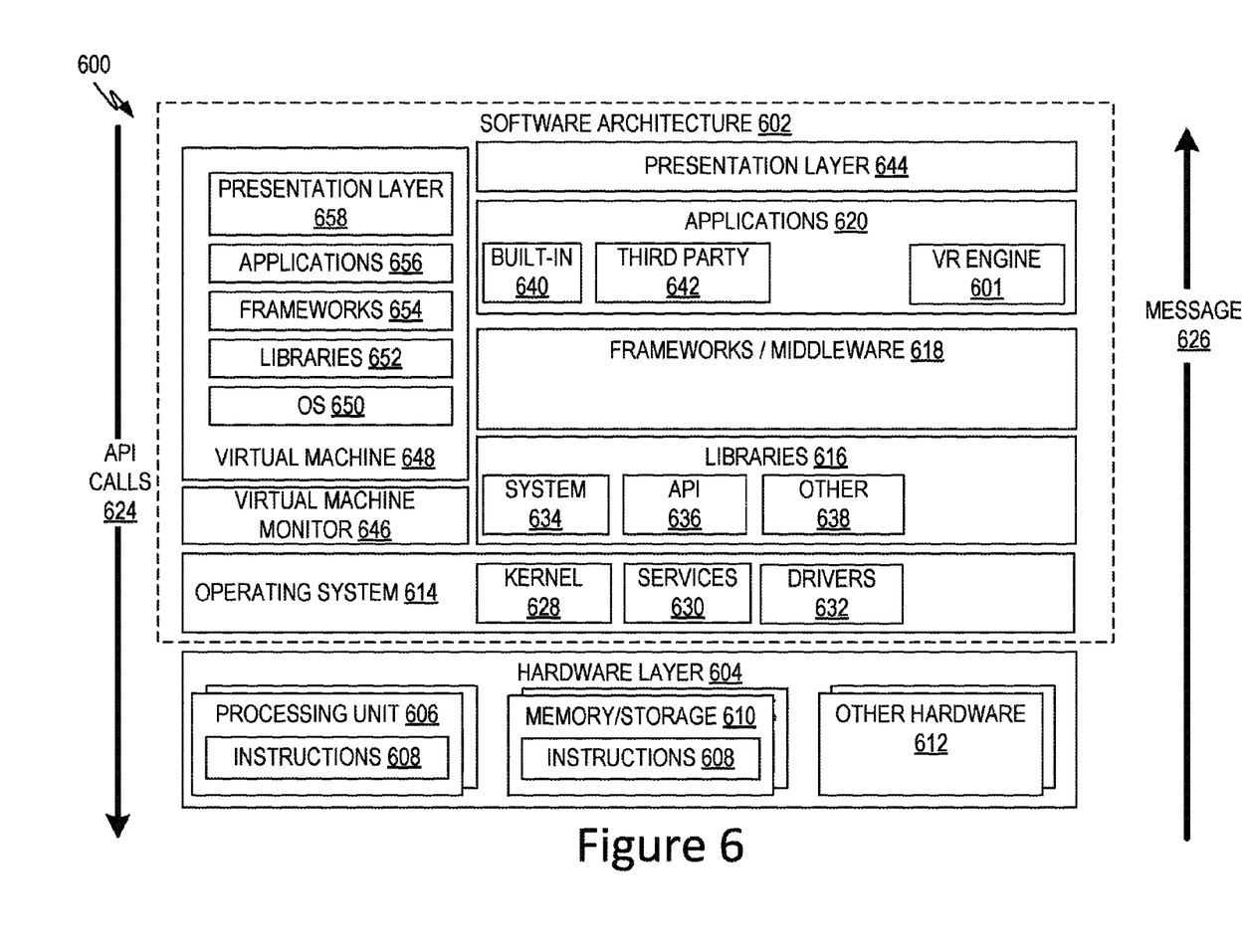
FIG. 6 is a block diagram illustrating an example software architecture, which may be used in conjunction with various hardware architectures herein described to provide a VR engine, which may be similar to the VR engine shown in FIG. 2.

FIG. 6 is a block diagram 600 illustrating an example software architecture 602, which may be used in conjunction with various hardware architectures herein described to provide a VR engine 601, which may be similar to the VR engine 212 as described above. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 having associated executable instructions 608. The executable instructions 608 represent the executable instructions of the software architecture 602, including implementation of the methods, modules and so forth described herein. The hardware layer 604 also includes memory/storage 610, which also includes the executable instructions 608. The hardware layer 604 may also comprise other hardware 612.

In the example architecture of FIG. 6, the software architecture 602 may be conceptualized as a stack of layers where each layer provides particular functionality. For example, the software architecture 602 may include layers such as an operating system 614, libraries 616, frameworks or middleware 618, applications 620 and a presentation layer 644. Operationally, the applications 620 and/or other components within the layers may invoke application programming interface (API) calls 624 through the software stack and receive a response as messages 626. The layers illustrated are representative in nature and not all software architectures have all layers. For example, some mobile or special purpose operating systems may not provide the frameworks/middleware 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be used by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The frameworks 618 (also sometimes referred to as middleware) provide a higher-level common infrastructure that may be used by the applications 620 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 642 may invoke the API calls 624 provided by the mobile operating system such as operating system 614 to facilitate functionality described herein.

The applications 620 may use built-in operating system functions (e.g., kernel 628, services 630 and/or drivers 632), libraries 616, or frameworks/middleware 618 to create user interfaces to interact with users of the system. Alternatively, or additionally, in some systems, interactions with a user may occur through a presentation layer, such as the presentation layer 644. In these systems, the application/module "logic" can be separated from the aspects of the application/module that interact with a user.

Some software architectures use virtual machines. In the example of FIG. 6, this is illustrated by a virtual machine 648. The virtual machine 648 creates a software environment where applications/modules can execute as if they were executing on a hardware machine (such as the machine 700 of FIG. 7, for example). The virtual machine 648 is hosted by a host operating system (e.g., operating system 614) and typically, although not always, has a virtual machine monitor 646, which manages the operation of the virtual machine 648 as well as the interface with the host operating system (i.e., operating system 614). A software architecture executes within the virtual machine 648 such as an operating system (OS) 650, libraries 652, frameworks 654, applications 656, and/or a presentation layer 658. These layers of software architecture executing within the virtual machine 648 can be the same as corresponding layers previously described or may be different.

Figure 7:
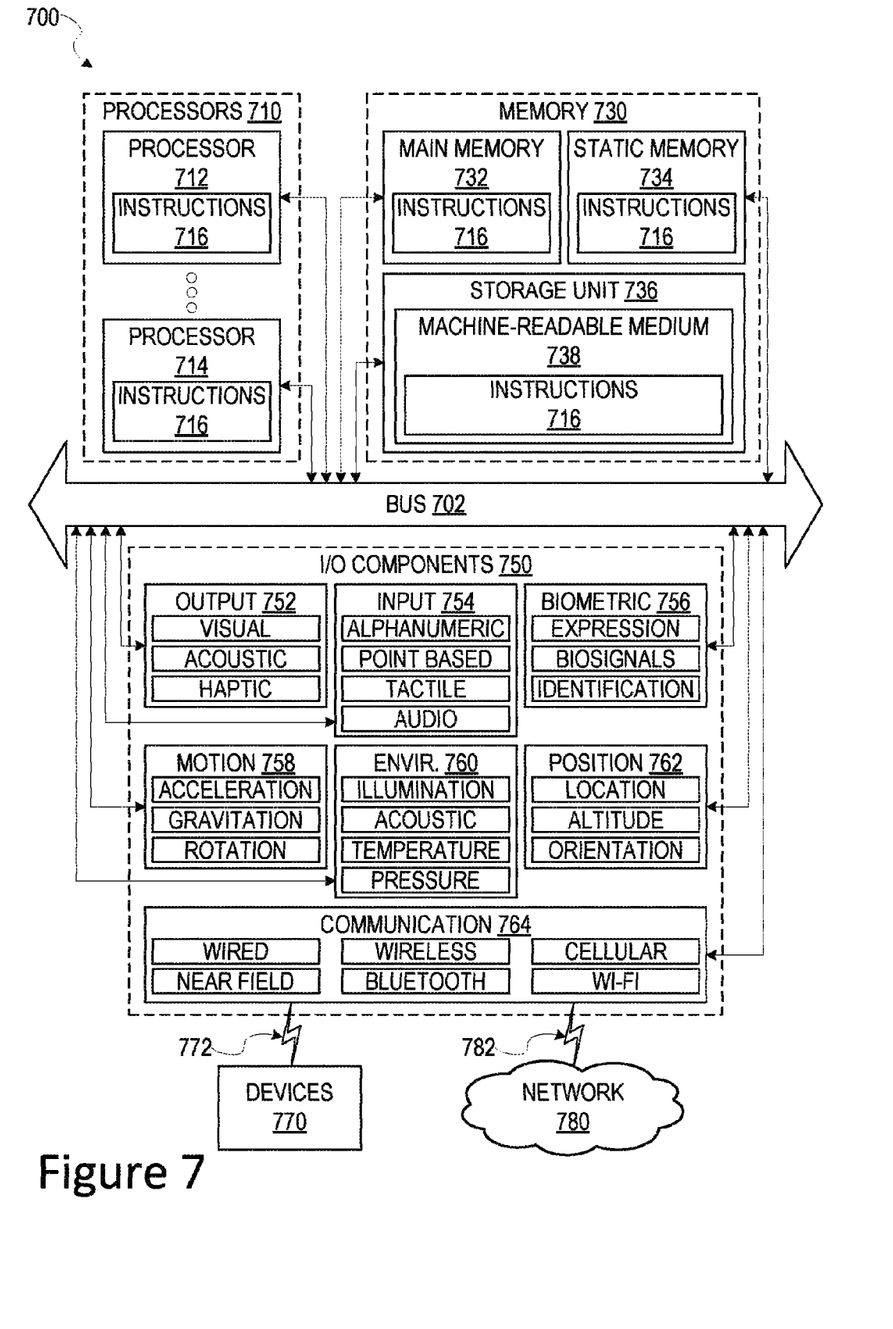
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 700, according to some example embodiments, configured to read instructions from a machine-readable medium (e.g., a machine-readable storage medium) and perform any one or more of the methodologies discussed herein. In some embodiments, the machine 110 is similar to the HMD 102 or the VR interaction device 202 shown in FIGS. 1-10. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. As such, the instructions 716 may be used to implement modules or components described herein. The instructions transform the general, non-programmed machine into a particular machine programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines that individually or jointly execute the instructions 716 to perform any one or more of the methodologies discussed herein.

The machine 700 may include processors 710, memory 730, and input/output (I/O) components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 714 that may execute the instructions 716. The term "processor" is intended to include multi-core processor that may comprise two or more independent processors (sometimes referred to as "cores") that may execute instructions contemporaneously. Although FIG. 7 shows multiple processors, the machine 700 may include a single processor with a single core, a single processor with multiple cores (e.g., a multi-core processor), multiple processors with a single core, multiple processors with multiples cores, or any combination thereof.

The memory/storage 730 may include a memory, such as a main memory 732, a static memory 734, or other memory, and a storage unit 736, both accessible to the processors 710 such as via the bus 702. The storage unit 736 and memory 732, 734 store the instructions 716 embodying any one or more of the methodologies or functions described herein. The instructions 716 may also reside, completely or partially, within the memory 732, 734, within the storage unit 736, within at least one of the processors 710 (e.g., within the processor's cache memory), or any suitable combination thereof, during execution thereof by the machine 700. Accordingly, the memory 732, 734, the storage unit 736, and the memory of processors 710 are examples of machine-readable media 738.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 750 may include a wide variety of components to receive input, provide output, produce output, transmit information, exchange information, capture measurements, and so on. The specific input/output (I/O) components 750 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 750 may include many other components that are not shown in FIG. 7. The input/output (I/O) components 750 are grouped according to functionality merely for simplifying the following discussion and the grouping is in no way limiting. In various example embodiments, the input/output (I/O) components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 750 may include communication components 764 operable to couple the machine 700 to a network 780 or devices 770 via a coupling 782 and a coupling 772 respectively. For example, the communication components 764 may include a network interface component or other suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 762, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A head-mounted display (HMD) device comprising:
   a first display surface and a second display surface, the first display surface associated with a first eye of the user, the second display surface associated with a second eye of the user;
   a graphics processing unit (GPU) configured to render graphical content on the first display surface and the second display surface;
   one or more hardware processors; and
   an adaptive rendering module, executable by the one or more hardware processors, configured to perform operations comprising:
     instructing the GPU to render first eye pixel data corresponding to a first item of the graphical content on the first display surface at a target resolution;
     instructing the GPU to render second eye pixel data corresponding to the first item of the graphical content on the second display surface at the target resolution;
     identifying a threshold frame time, the threshold frame time representing an upper threshold of time for the GPU to render the graphical content at the target resolution;
     receiving a first frame time, the first frame time being an amount of time the GPU takes to render the first eye pixel data corresponding to the first item at the target resolution on the first display surface and the second eye pixel data corresponding to the first item at the target resolution on the second display surface;
     anticipating that a second frame time will exceed the threshold frame time, the second frame time being an amount of time that the GPU will take to render first eye pixel data corresponding to a second item of graphical content at the target resolution on the first display and second eye pixel data corresponding to the second item at the target resolution on the second display; and
     based on the anticipating that the second frame time will exceed the threshold frame time, instructing the GPU to render at least parts of the first eye pixel data corresponding to the second item at a reduced resolution on the first display while also instructing the GPU to render all of second eye pixel data corresponding to the second item at the target resolution on the second display, the reduced resolution being an amount of resolution lower than the target resolution, wherein the first eye of the user is designated as a reduced resolution eye, the second eye of the user is designated as a target resolution eye, and the operations further comprise switching the designation of the reduced resolution eye and the designation of the target resolution eye at a pre-determined interval.

2. The MID device of claim 1, wherein instructing of the GPU to render at least parts of the first eye pixel data corresponding to the second item at the reduced resolution includes transmitting modified rendering instructions to the GPU, the modified rendering instructions including the reduced resolution, and wherein the instructing of the GPU to render all of the second eye pixel data corresponding to the second item at the target resolution includes transmitting normal rendering instructions to the CPU, the normal rendering instructions including the target resolution.

3. The HMD device of claim 1, wherein the pre-determined interval is a pre-determined number of frames.

4. The HMD device of claim 1, wherein the threshold frame time is based on a frame rate that is greater than or equal to 120 frames per second (fps) and wherein the pre-determined interval is every other frame.

5. The HMD device of claim 1, the operations further comprising determining the reduced resolution based on a difference between the first frame time and the threshold frame time.

6. The HMD device of claim 1, the operations further comprising determining the amount of resolution lower than the target resolution based on an amount needed to maintain a target frame rate.

7. The HMD device of claim 1, further comprising, based on the switching of the designation of the reduced resolution eye and the designation of the target resolution eye, instructing the GPU to render at least parts of second eye pixel data corresponding to a subsequent items of graphical content at an additional reduced resolution while also instructing the GPU to render all of first eye pixel data corresponding to the subsequent items at the target resolution, the additional reduced resolution being an amount of resolution lower than the target resolution.

8. The HMD device of claim 1, wherein the target resolution is based on a maximum resolution of the first display surface or the second display surface.

9. The HMD device of claim 1, wherein the target resolution is based on reducing an amount of flicker that is perceptible to the user when viewing the graphical content.

10. The HMD device of claim 1, wherein the target resolution is based on reducing an amount of discomfort that the user experiences when viewing the graphical content.

11. The HMD device of claim 1, wherein the anticipating is further based on a determination that the second item of graphical content includes at least one aspect that will increase a computational burden on the GPU in comparison to the first item of graphical content.

12. A computer-implemented method comprising:
instructing the GPU to render first eye pixel data corresponding to a first item of graphical content on a first display surface at a target resolution;
instructing the GPU to render second eye pixel data corresponding to the first item of graphical content on a second display surface at the target resolution;
identifying a threshold frame time, the threshold frame time representing an upper threshold of time for the GPU to render the graphical content at the target resolution;
receiving a first frame time, the first frame time being an amount of time the GPU takes to render the first eye pixel data at the target resolution on the first display surface and the second eye pixel data at the target resolution on the second display surface;
anticipating that a second frame time will exceed the threshold frame time, the second frame time being an amount of time that the GPU will take to render first eye pixel data corresponding to a second item of graphical content at the target resolution on the first display and second eye pixel data corresponding to the second item at the target resolution on the second display; and
based on the anticipating that the second frame time will exceed the threshold frame time, instructing the GPU to render at least for parts of first eye pixel data corresponding to the second item at a reduced resolution while also instructing the GPU to render all of second eye pixel data for parts of the second item at the eye of the user, the reduced resolution being an amount of resolution lower than the target resolution, wherein the first eye of the user is designated as a reduced resolution eye, the second eye of the user is designated as a target resolution eye, and the operations further comprise switching the designation of the reduced resolution eye and the designation of the target resolution eye at a pre-determined interval.

13. The method of claim 12, wherein instructing of the GPU to render at least parts of the first eye pixel data corresponding to the second item at the reduced resolution includes transmitting modified rendering instructions to the GPU, the modified rendering instructions including the reduced resolution, and wherein the instructing of the GPU to render all of the second eye pixel data corresponding to the second item at the target resolution includes transmitting normal rendering instructions to the GPU, the normal rendering instructions including the target resolution.

14. The method of claim 12, wherein the pre-determined interval is a pre-determined number of frames.

15. The method of claim 12, wherein the threshold frame time is based on a frame rate that is greater than or equal to 120 frames per second (fps) and wherein the pre-determined interval is every other frame.

16. The method of claim 12, further comprising determining an amount of the lowering of the resolution of the parts of the second frame based on a difference between the first frame time and the threshold frame time.

17. The method of claim 12, further comprising determining an amount of the lowering of the resolution of the parts of the second frame based on an amount needed to maintain a target frame rate.

18. A non-transitory machine-readable medium storing processor-executable instructions which, when executed by a processor, cause the processor to perform operations comprising:
instructing the GPU to render first eye pixel data corresponding to a first item graphical content on a first display surface at a target resolution;
instructing the GPU to render second eye pixel data corresponding to the first item of graphical content on a second display surface at the target resolution;
identifying a threshold frame time, the threshold frame time representing an upper threshold of time for the GPU to render the graphical content at the target resolution;
receiving a first frame time, the first frame time being an amount of time the GPU takes to render the first eye pixel data at the target resolution on the first display surface and the second eye pixel data at the target resolution on the second display surface;
anticipating that a second frame time will exceed the threshold frame time, the second frame time being an amount of time that the GPU will take to render first eye pixel data corresponding to a second item of graphical content at the target resolution on the first display and second eye pixel data corresponding to the second item at the target resolution on the second display; and based on the anticipating that the second frame time will exceed the threshold frame time, instructing the GPU to render at least for parts of first eye pixel data corresponding to the second item at a reduced resolution while also instructing the GPU to render all of second eye pixel data for parts of the second item at the eye of the user, the reduced resolution being an amount of resolution lower than the target resolution, wherein the first eye of the user is designated as a reduced resolution eye, the second eye of the user is designated as a target resolution eye, and the operations further comprise switching the designation of the reduced resolution eye and the designation of the target resolution eye at a pre-determined interval.

19. The non-transitory machine-readable medium of claim 18, wherein instructing of the GPU to render at least parts of the first eye pixel data corresponding to the second item at the reduced resolution includes transmitting modified rendering instructions to the GPU, the modified rendering instructions including the reduced resolution, and wherein the instructing of the GPU to render all of the second eye pixel data corresponding to the second item at the target resolution includes transmitting normal rendering instructions to the GPU, the normal rendering instructions including the target resolution.

20. The non-transitory machine-readable medium of claim 18, wherein the pre-determined interval is a pre-determined number of frames.

21. The non-transitory machine-readable medium of claim 18, the operations further comprising determining an amount of the lowering of the resolution of the parts of the second frame based on a difference between the first frame time and the threshold frame time.

22. The non-transitory machine-readable medium of claim 18, the operations further comprising determining an amount of the lowering of the resolution of the parts of the second frame based on an amount needed to maintain a target frame rate.

* * * * *

UNITED STATES PATENT AND TRADEMARK OFFICE
CERTIFICATE OF CORRECTION

PATENT NO. : 9,940,858 B2  
APPLICATION NO. : 15/596909  
DATED : April 10, 2018  
INVENTOR(S) : Juho Henri Rikhard Oravainen Page 1 of 1

It is certified that error appears in the above-identified patent and that said Letters Patent is hereby corrected as shown below:

In the Claims

In Column 17, Line 4, in Claim 2, delete "MID" and insert --HMD-- therefor

In Column 17, Line 12, in Claim 2, delete "CPU," and insert --GPU,-- therefor

In Column 18, Line 52, in Claim 18, after "item", insert --of--

Signed and Sealed this  
Fifth Day of January, 2021

Andrei Iancu  
*Director of the United States Patent and Trademark Office*